United States Patent

McHugh et al.

[11] Patent Number: 6,083,639
[45] Date of Patent: Jul. 4, 2000

[54] CURRENT INTERRUPTER FOR ELECTROCHEMICAL CELLS

[75] Inventors: William T. McHugh, Westwood; Viet H. Vu, Milford, both of Mass.; Lucien P. Fontaine, Lincoln, R.I.; Jane A. Blasi, Acton; Reynald Cantave, Bridgewater, both of Mass.

[73] Assignee: Duracell Inc., Bethel, Conn.

[21] Appl. No.: 08/916,627

[22] Filed: Aug. 22, 1997

[51] Int. Cl.[7] .......................... H01M 10/50; H01M 10/34
[52] U.S. Cl. .................... 429/62; 429/57; 429/58
[58] Field of Search .................. 429/7, 54, 56, 429/57, 58, 59, 62

[56] References Cited

U.S. PATENT DOCUMENTS

| | | | |
|---|---|---|---|
| 3,373,057 | 3/1968 | Jost et al. | 136/6 |
| 3,617,386 | 11/1971 | Bosben et al. | 136/107 |
| 4,035,552 | 7/1977 | Epstein | 429/58 |
| 4,855,195 | 8/1989 | Georgopoulos et al. | 429/54 |
| 4,975,341 | 12/1990 | Tucholski et al. | 429/62 |
| 4,992,339 | 2/1991 | Georgopoulos | 429/7 |
| 5,567,539 | 10/1996 | Takahashi et al. | 429/57 |
| 5,691,073 | 11/1997 | Vu et al. | 429/7 |
| 5,747,187 | 5/1998 | Byon | 429/58 |
| 5,750,277 | 5/1998 | Vu et al. | 429/7 |
| 5,766,791 | 6/1998 | Takahashi et al. | 429/57 |
| 5,766,793 | 6/1998 | Kameishi et al. | 429/62 |
| 5,776,790 | 6/1998 | Kameishi et al. | 429/59 |

FOREIGN PATENT DOCUMENTS 9-106803   4/1997   Japan .
9-106804   4/1997   Japan .

Primary Examiner—Maria Nuzzolillo
Assistant Examiner—Jonathan Crepeau
Attorney, Agent, or Firm—Barry D. Josephs; Paul I. Douglas; Thomas G. Krivulka

[57] ABSTRACT

A current interrupt assembly for electrochemical cells is disclosed. The current interrupter assembly may be a self-contained, sealed unit which may be separately inserted into the cell during cell construction. Several current interrupt assemblies may be inserted in the cell. The current interrupter assembly has particular utility for thin rechargeable cells and when inserted in the cell forms a portion of the electrical pathway between a cell electrode and corresponding terminal. The current interrupt mechanism comprises a thin thermally responsive member preferably comprising a disk of a shape memory metal alloy having a curved surface. When cell temperature exceeds a predetermined value the disk deflects to cause a break in the electrical pathway within the assembly. The assembly may include therein a flexible electrically conductive member which forms a part of the electrical pathway within the assembly and which is physically responsive to deflection of the thermally responsive member. The assembly may also include a pressure actuated diaphragm which may form a portion of the assembly housing. When the cell internal pressure exceeds a predetermined level the diaphragm deflects causing a break in the electrical pathway within the assembly, thereby shutting down the cell.

9 Claims, 7 Drawing Sheets

CURRENT INTERRUPTER FOR ELECTROCHEMICAL CELLS

FIELD OF THE INVENTION

This invention relates to a thermally responsive current interrupter for an electrochemical cell, which safely prevents current flow through the cell upon an excessive increase in the temperature thereof. The invention also relates to a pressure responsive current interrupter for a cell, which safely shuts down the cell upon excessive gas pressure buildup therein.

BACKGROUND OF THE INVENTION

Electrochemical cells, especially high energy density cells such as those in which lithium or lithium ion is an active material, are subject to leakage or rupture which, in turn, can cause damage to the device which is powered by the cell or to the surrounding environment. In the case of rechargeable cells, the rise in internal temperature of the cell can result from overcharging. Undesirable temperature increases are often accompanied by a corresponding increase in internal gas pressure. This is likely to occur in the event of an external short circuit condition. Also, the internal gas pressure can increase in the event that the cell is overdischarged. It is desirable that safety devices accompany the cell without unduly increasing the cost, size or mass of the cell.

Such cells, particularly rechargeable cells utilizing lithium or lithium ion as an active material, are subject to leakage or rupture caused by a rise in internal temperature of the cell which often is accompanied by a corresponding increase in pressure. This is likely to be caused by abusive conditions, such as overcharging or by a short circuit condition which may occur during overdischarging. It is also important that these cells be hermetically sealed to prevent the egress of electrolyte solvent and the ingress of moisture from the exterior environment.

As set forth above, as such a cell is charged, self-heating occurs. Charging at too rapid a rate or overcharging can lead to an increase in the temperature. When the temperature exceeds a certain point, which varies depending upon the chemistry and structure of the cell, an undesirable and uncontrollable thermal runaway condition begins. In addition, because of the overheating, internal pressure builds up, and electrolyte may suddenly be expelled from the cell. It is preferable to initiate controlled venting before that takes place.

Some rechargeable cells can be very thin, for example, thin prismatic cells, or small size cylindrical cells for cellular phones. It has been difficult to incorporate reliable current interrupt safety devices into such cells because of their small size. But the need for such safety devices is all the greater because of the proximity of the cell to the consumer during normal cellular phone operation.

Conventional cell designs employ an end cap fitting which is inserted into an open ended cylindrical casing after the cell anode and cathode active material and appropriate separator material and electrolyte have been inserted into the cylindrical case. The end cap is in electrical contact with one of the anode or cathode material and the exposed portion of the end cap forms one of the cell terminals. A portion of the cell casing forms the other terminal.

SUMMARY OF THE INVENTION

The present invention has one or several current interrupt assemblies integrated within a single cell and is applied advantageously to primary or secondary (rechargeable) cells. The end cap assembly of the invention has particular application to rechargeable cells, for example lithium-ion, nickel metal hydride, nickel cadmium or other rechargeable cells, to overcome the danger of the cell overheating and pressure building up in the cell during exposure to high temperatures, excessive or improper charging or discharging, or shorting of the cell.

In one aspect the invention is directed to a current interrupt mechanism for thin prismatic cells or small diameter cylindrical cells. A small thermally responsive current interrupt assembly is located within the cell. The current interrupt assembly is preferably a self-contained, sealed device which has the advantage that it may be separately manufactured and inserted in the cell as a separate unit during cell construction. A thermally responsive current interrupt mechanism within the self-contained assembly activates to interrupt and prevent current from flowing through the cell when the cell interior overheats to exceed a predetermined temperature. The current interrupt mechanism comprises a thermally responsive member, desirably a flexible disk preferably composed of a shape memory metal alloy having a curved surface. In normal cell operation the shape memory alloy disk preferably forms a portion of the electrical pathway between one of the cell electrodes and a terminal to which the electrode is connected. When the temperature within the cell reaches a predetermined value, the shape memory disk deflects to break the electrical pathway between said electrode and the terminal thereby shutting down the cell.

In another aspect of the invention the current interrupt assembly is a self-contained unit comprising both a thermally responsive current interrupt mechanism and a pressure actuated current interrupt mechanism. The current interrupt assembly has an exposed end cap plate which functions as a terminal of the cell. When the assembly is applied to a cell and the cell is in normal operation the end cap plate is in electrical communication with a cell electrode (anode or cathode). The current interrupt mechanism comprises a thermally responsive flexible member composed of a shape memory metal alloy or a bimetal, desirably in the form of curved disk, which may be in physical communication with a flexible electrically conductive member. Physical communication between the thermally responsive member and flexible conductive member may be achieved by an electrically nonconductive moveable rod positioned between these two elements. In normal cell operation the flexible conductive member forms a portion of the electrical pathway between one of the cell electrodes and the end cap (terminal). When the temperature within the cell reaches a predetermined value, the thermally responsive member deflects causing the nonconductive moveable rod to push against the flexible conductive member in turn causing it to deflect and break the electrical pathway between said electrode and the terminal. The assembly desirably also includes a pressure actuated current interrupt mechanism which preferably includes a pressure actuated metal diaphragm. The diaphragm preferably forms a portion of the current interrupter assembly housing and deflects when pressure within the cell exceeds a predetermined level. The deflection of the diaphragm causes a break in the electrical pathway between a cell electrode and corresponding terminal thereby shutting down the cell.

In another aspect the cell may contain both of the above two types of self-contained current interrupt assemblies, namely one containing only a thermally responsive current interrupt mechanism and the other containing both a thermally responsive current interrupt mechanism and a pressure actuated current interrupt mechanism. This provides the cell with multiple independent current interrupt safety features. Such design may be used advantageously if the cell is of sufficient diameter to house both current interrupt assemblies, for example, a cell having a diameter or overall thickness between about 5 and 20 mm. In such embodiment the current interrupt assembly containing only the thermally responsive current interrupt mechanism may advantageously be located completely within the cell interior so that it is closest to the hottest part of the cell.

DETAILED DESCRIPTION

Figure 1:
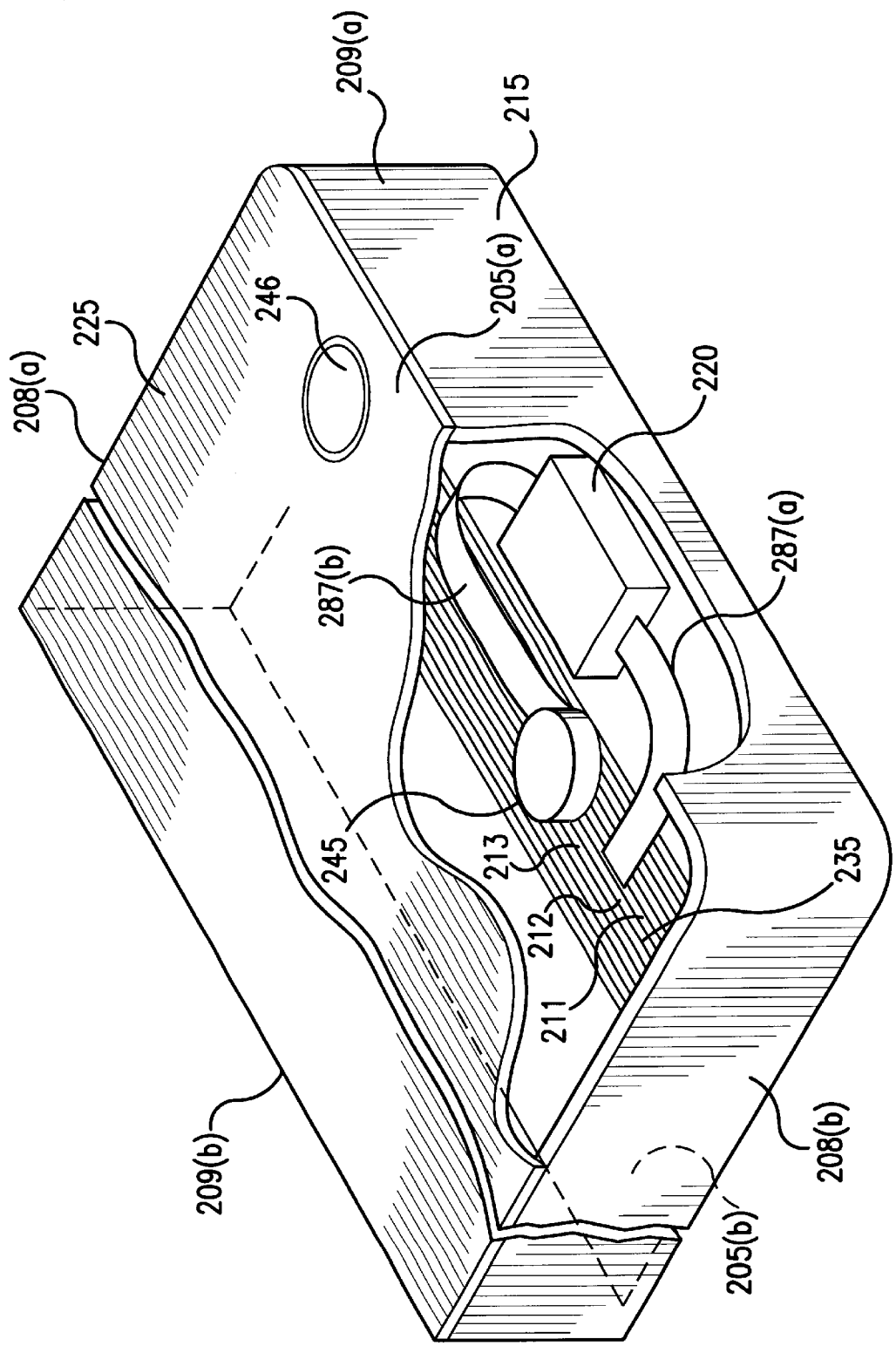
FIG. 1 is a cut-away perspective view of an embodiment of the current interrupter assembly of the invention placed wholly within a prismatic cell.

In a preferred embodiment the thermally responsive current interrupter assembly 220 of the invention may be located internally wholly within a cell 215 as shown in FIG. 1. Cell 215 may be a prismatic cell having a parallelepiped shaped casing 225 as shown in FIG. 1, but alternatively may be a thin diameter cylindrical cell. If cell 215 is a prismatic cell it typically has a small overall thickness between about 3 and 10 mm; typically the prismatic cell is very thin having an overall thickness between about 3 and 6 mm. If cell 215 is a small diameter cylindrical cell, the diameter may typically be between about 3 and 10 mm. The current assembly 220 as described herein may be integrated into larger size cells, for example prismatic cells having a thickness between about 3 and 15 mm or cylindrical cells having a diameter between about 3 and 15 mm, but the assembly 220 has particular utility for small thickness prismatic or small diameter cylindrical cells. Cell 215 may be a primary or rechargeable cell such as a lithium ion cell, nickel metal hydride cell or nickel cadmium cell, but advantageously is a rechargeable cell such as a lithium ion cell. A lithium ion rechargeable cell is characterized by the transfer of lithium ions from the negative electrode to the positive electrode upon cell discharge and from the positive electrode to the negative electrode upon cell charging. It may typically have a positive electrode of lithium cobalt oxide ($Li_xCoO_2$) or lithium manganese oxide of spinel crystalline structure ($Li_xMn_2O_4$) and a carbon negative electrode. The negative electrode constitutes the anode of the cell during discharge and the cathode during charging, and the positive electrode constitutes the cathode of the cell during discharge and the anode during charging. The electrolyte for such cells may comprise a lithium salt dissolved in a mixture of non-aqueous solvents. The salt may be $LiPF_6$ and the solvents may advantageously include dimethyl carbonate (DMC), ethylene carbonate (EC), propylene carbonate (PC) and mixtures thereof. In the specific embodiment shown in FIG. 1 cell 215 is a prismatic lithium ion cell having a casing 225 formed of opposing flat body faces 205(a) and 205(b), flat side faces 208(a) and 208(b) and flat end faces 209(a) and 209(b). Positive terminal 245 and negative terminal 246 are exposed from the same body face 208(a) and are accessible for connection to a device to be powered. An electrode stack 235 is shown comprising a sheet of positive electrode material 211, a sheet of negative electrode material 213 with conventional porous separator material 212 therebetween. The stack 235 may be wound in conventional jelly roll fashion and the wound material then flattened so that it fits compactly within the cell.

Figure 2:
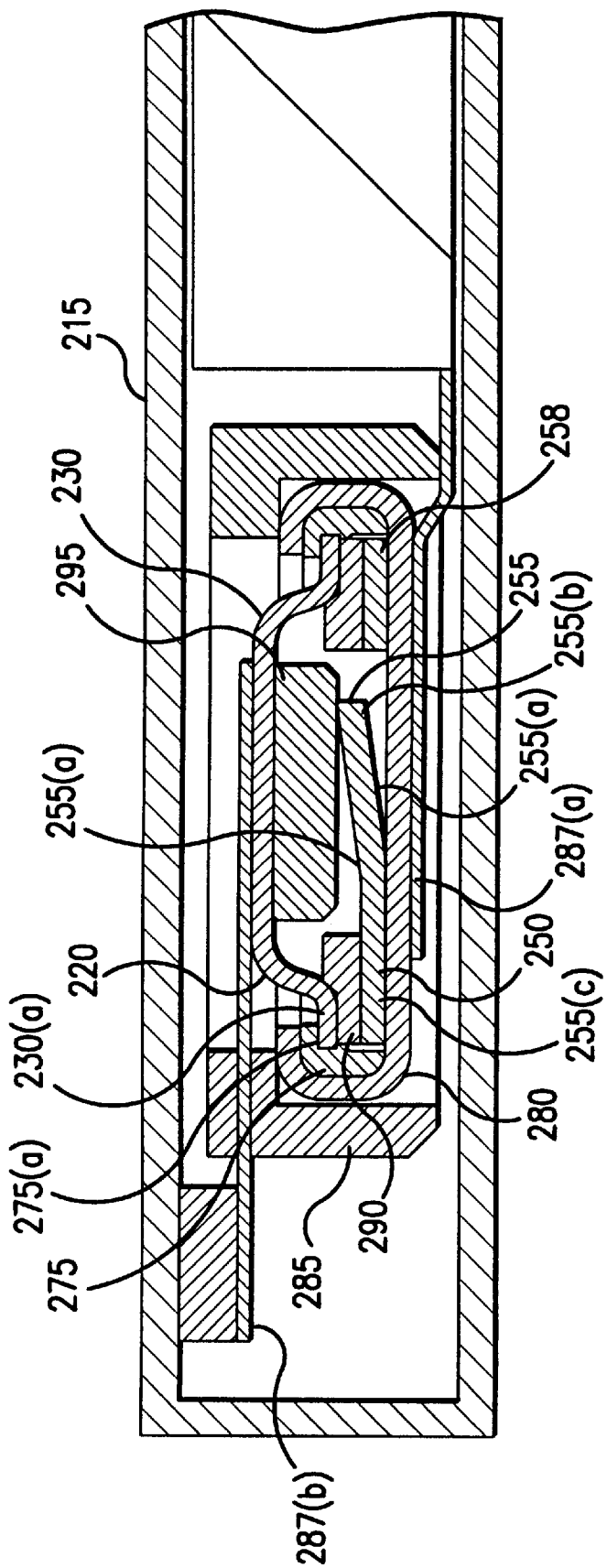
FIG. 2 is a cross sectional view of the cell and current interrupter assembly shown in FIG. 1.
Figure 3:
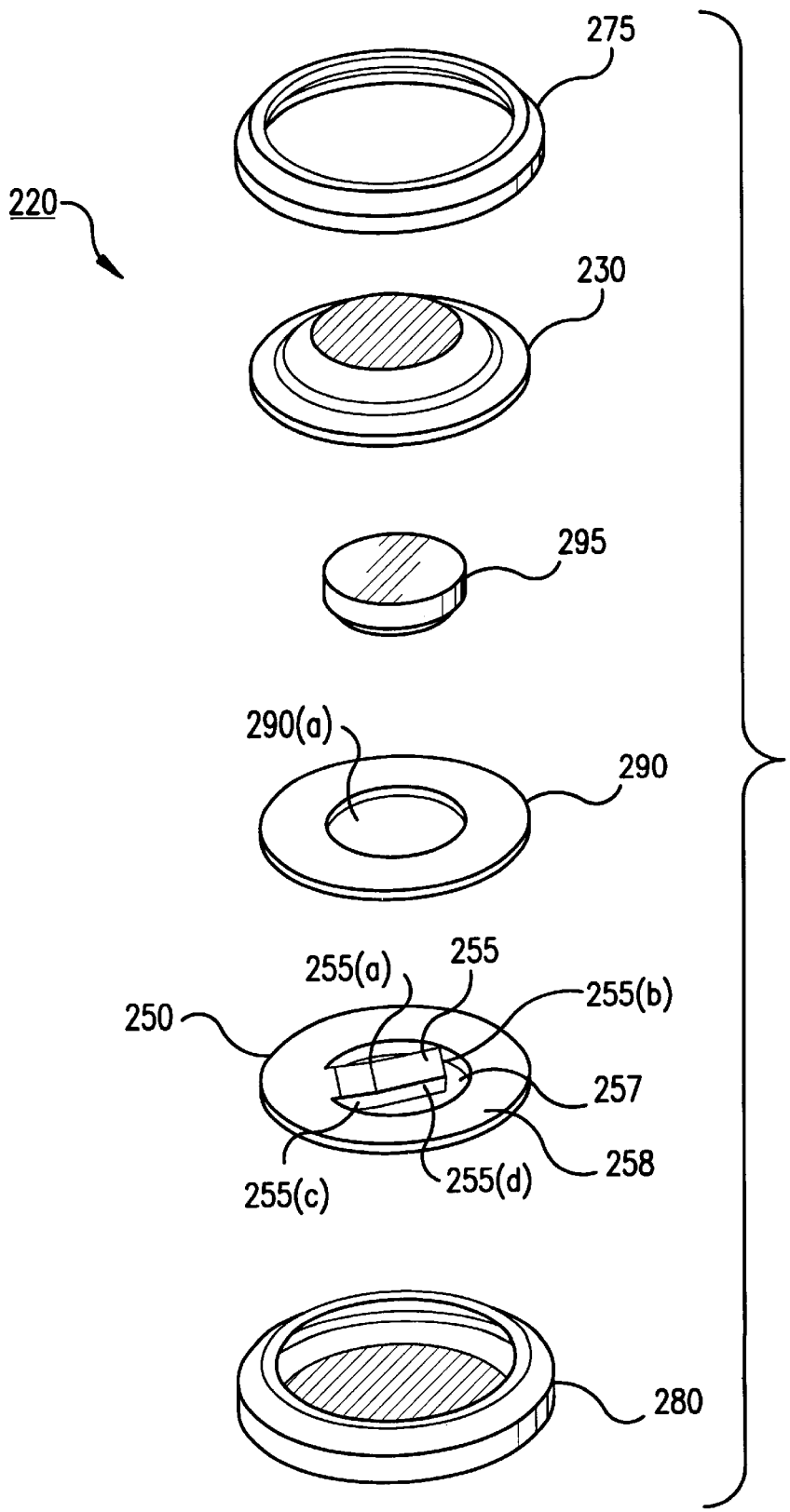
FIG. 3 is an exploded perspective view of the components of the current interrupter assembly shown in FIGS. 1 and 2.

A thermally responsive current interrupter assembly 220 of the invention may be integrated into a lithium ion prismatic cell 215 as shown in FIG. 1. In such embodiment the current interrupter assembly is placed wholly within the cell interior and is electrically connected at one end to the positive electrode 211 and at the other end to positive terminal 245. Thus, under normal operation there is an electrical pathway between the positive electrode 211 and the positive terminal 245. A preferred embodiment of current interrupter assembly 220 is shown in FIG. 2. Assembly 220 is a self-contained, sealed unit comprising a metal casing 280, a metal end cap 230, a current interrupter disk 250, preferably formed of a shape memory alloy, and a metal contact plate 295 contacting the inside surface of cap 230. As shown in FIG. 2, assembly 220 is within member 285. End cap 230 is concaved so that its surface bulges outwardly as shown in FIG. 2. Casing 280 is in the form of a cup shaped circular structure having an open end and a slightly bulging body as shown in FIG. 3. Assembly 220 has an insulating ring 290 between the peripheral edge of disk 250 and the peripheral edge 230(a) of end cap 230. Preferred structure for each of the assembly 220 components is shown in FIG. 3. Current interrupter disk 250 has a thickness which is small compared to its diameter or average width and is preferably circular or cylindrical but may also be of other shapes, for example, it may be oval, or elliptical or in the form of a thin parallelepiped or thin elongated slab or plate with one or more pairs of opposing edges which may not be parallel. Such structures preferably have a thickness which is less than about 30% of its length and also less than about 30% of its average width. Thus the term disk, as used herein and specifically in connection with thermally responsive members 250, 350, and 352, is intended to be construed to include such other shapes. In the case of an oval or elliptical shaped disk, the term average width shall refer to the smallest diameter of its major face.

The thickness of disk 250 is desirably less than 1 mm, preferably between about 0.05 and 0.5 mm. A preferred embodiment of current interrupter disk 250 shown best in FIG. 3 has an outer edge 258 and hollow central portion 257. A flexible, resilient portion 255 protrudes inwardly into the hollow portion 257 from peripheral edge 258. The flexible portion 255 is preformed advantageously with a slight upward bend 255(a) in its surface as shown in FIG. 3 so that its end 255(b) rests in a first position against contact plate 295 to complete the electrical pathway between positive electrode 211 and positive terminal 245. During normal operation current passes from positive electrode 211 to connector tab 287(a) to casing 280 to current interrupter disk 250 and flexible portion 255 to contact plug 295 to assembly end cap 230 to connector tab 287(b) and then to positive terminal 245. As may be seen from FIG. 1, current interrupter disk 250 is oriented within the assembly so that current passes through the thickness of disk 250 and therefore the thickness of flexible portion 255, to minimize resistance. When the temperature within cell 215 exceeds a predetermined value, end 255(b) deflects downward to a second position to break contact with contact plate 295 thereby breaking the electrical pathway between electrode 211 and terminal 245 to shut down the cell.

With reference to FIG. 3 current interrupter assembly 220 is designed to be readily constructed by inserting current interrupter disk 250 into open ended casing 280 so that it rests on the bottom surface of the casing. Insulating ring 290 is then inserted over disk 250 and metal contact plug 295 which is in the form of a solid disk shaped plug is inserted through the aperture 290(a) in insulating ring until it rests on protruding resilient member 255, preferably composed of a shape memory alloy. Insulating grommet 275 is inserted over end cap 230 and these two pieces are then placed over metal contact plug 295 so that the inside surface of end cap 230 contacts the top surface of contact plug 295. The peripheral edge of casing 280 and peripheral edge of insulating grommet 275 are then crimped over the peripheral edge 230(a) of end cap 230. Radial pressure is applied during crimping so that peripheral edge 230(a) of end cap 230 bites into the inside surface of peripheral edge 275(a) of insulating grommet 275 to form a tight seal between end cap 230 and casing 280.

Figure 4:
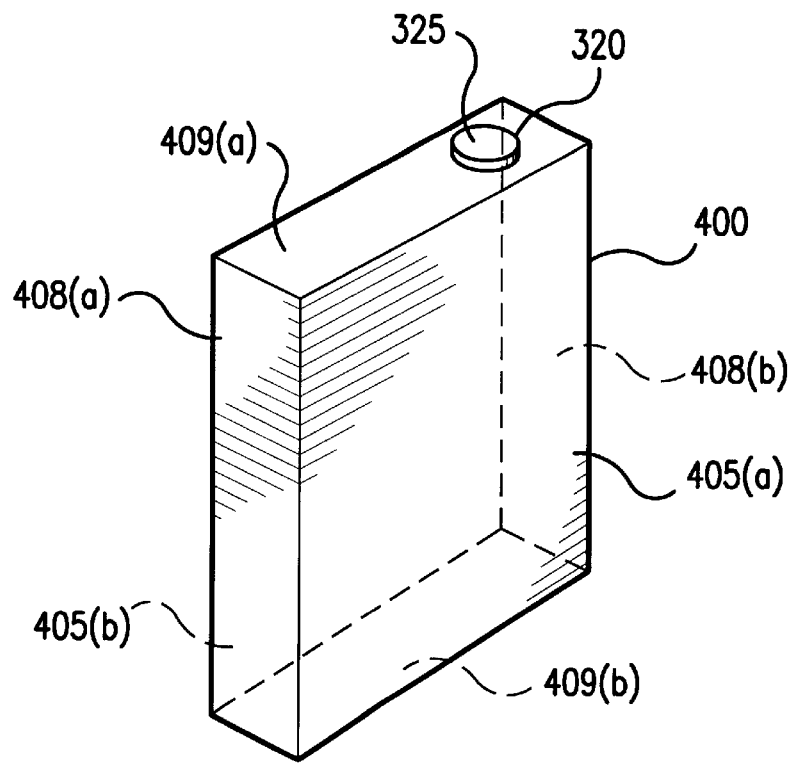
FIG. 4 is a perspective view of prismatic cell with another embodiment of the current interrupter assembly shown protruding from an end of the cell.
Figure 5:
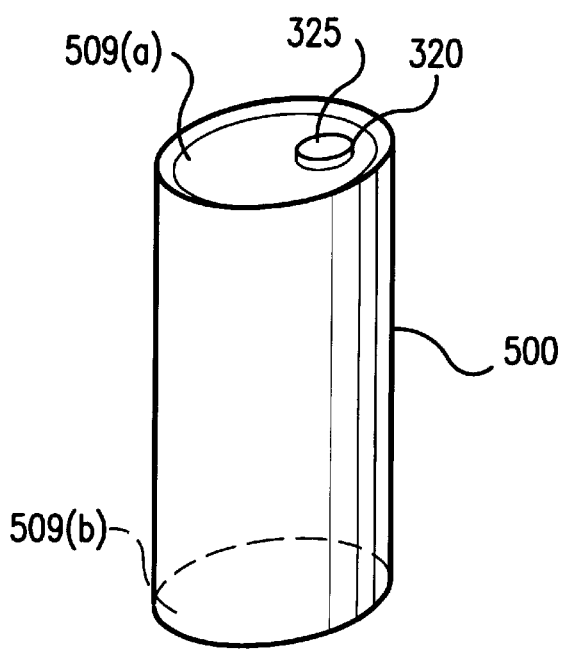
FIG. 5 is a perspective view of a cylindrical cell with the same embodiment of the current interrupter assembly shown in FIG. 4.
Figure 6:
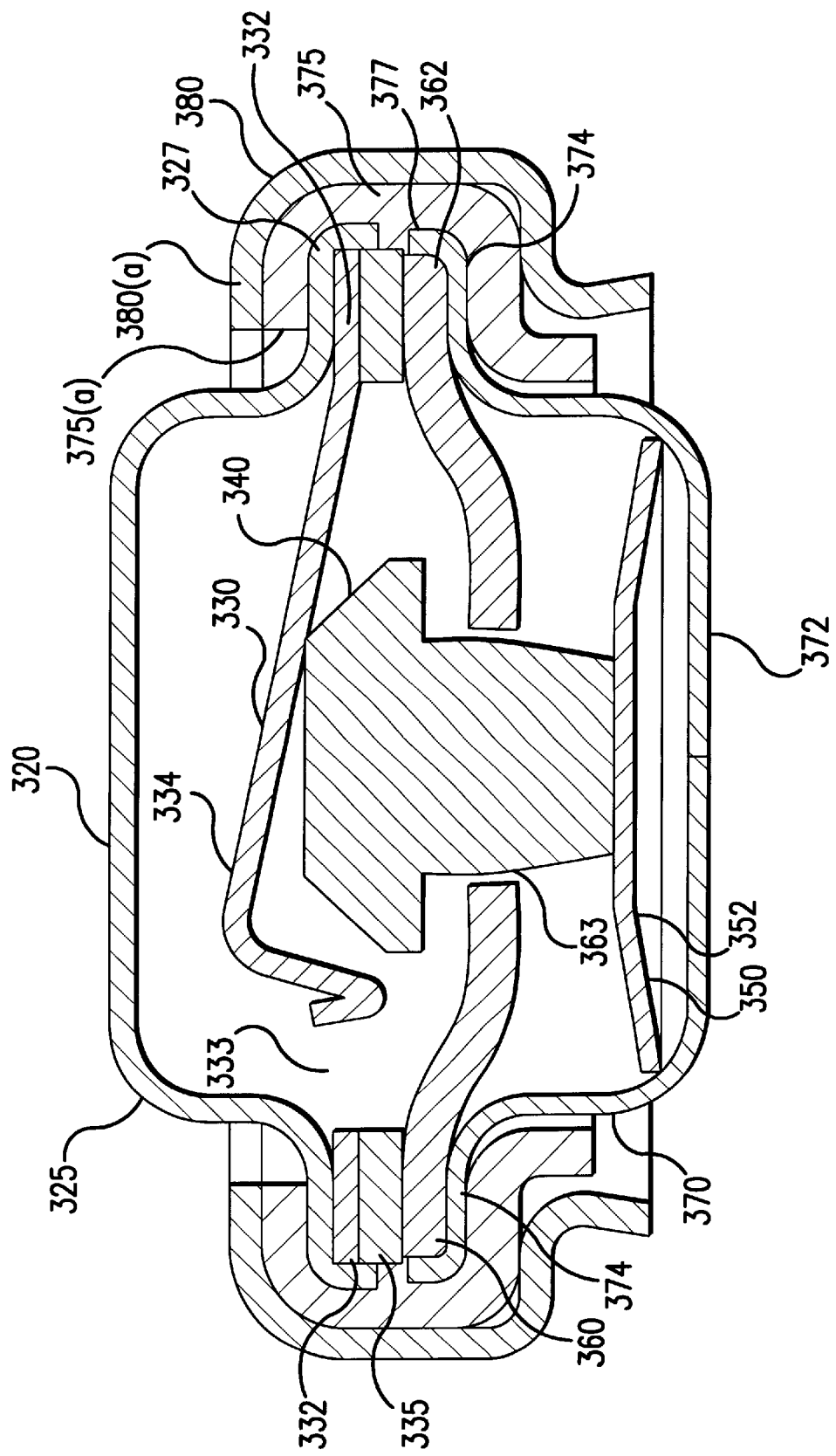
FIG. 6 is a cross-sectional view of the current interrupter assembly shown in FIGS. 4 and 5.
Figure 7:
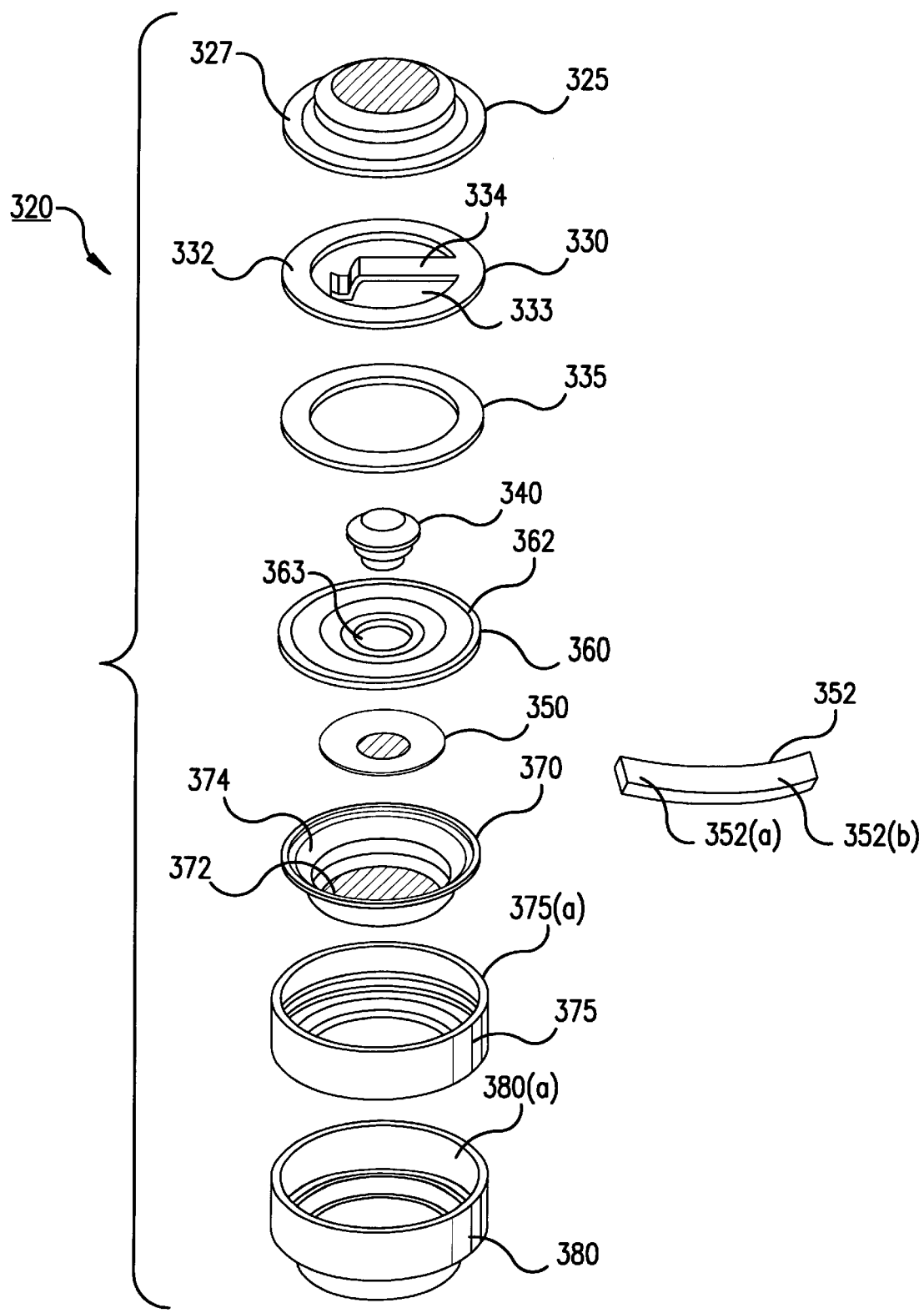
FIG. 7 is an exploded perspective view of the current interrupter assembly shown in FIGS. 4, 5, and 6.

Another embodiment of the thermal current interrupter assembly, namely, assembly 320 is shown in FIGS. 6 and 7. This embodiment of the current interrupter is designed to protrude from an end of a prismatic cell as shown in FIG. 4 or from an end of a cylindrical cell as shown in FIG. 5. In such embodiment the overall thickness of the prismatic cell is advantageously at least about 6 mm, typically between about 6 and 20 mm, which is a large enough thickness to accommodate assembly 320. If the cell is cylindrical, as shown in FIG. 5, it desirably has a diameter at least as great as AAA size cells, in order to accommodate assembly 320. Thus, assembly 320 may conveniently be applied to protrude from the end of AAA, AA, A, C or D size cylindrical cells or, for example, cells having a diameter between about 5 and 20 mm. When used in this manner the protruding portion of assembly 320, namely, end cap 325 may conveniently form one of the cell terminals.

Current interrupter assembly 320 may have an end cap 325 desirably in the shape of an inverted cup which forms the upper portion of assembly 320 and a cup shaped body 370 which form the lower portion of the assembly as shown in FIG. 6. End cap 325 and body 370 are formed of electrically conductive material. The base 372 of cup shaped body 370 preferably forms a pressure actuated diaphragm which is designed to deflect upwards (towards end cap 325) when pressure within the cell exceeds a predetermined value. A flexible heat responsive member 350 or 352 advantageously composed of a shape memory alloy or bimetal is located within the bottom portion of cup 370 and in proximity to pressure diaphragm 372. The heat responsive member may desirably be in the form of a disk, such as disk 350 or 352, having a curved surface as shown in FIG. 7. The curved surface 352 has opposing ends 352(a) and 352(b) as shown in FIG. 7. Either structure may be used when a shape memory alloy or bimetal composition is employed, however, the elongated slab or parallelepiped structure 352 is preferred when a shape memory alloy is employed and the circular disk 350 structure is preferred when a bimetal composition is employed. Desirably disk 350 (or disk 352) is positioned within assembly 320 so that it lies substantially in a plane parallel to the surface of end cap 325. An electrically insulating rod or plug 340 may rest on the top surface of flexible heat responsive member 350. Assembly 320 desirably includes a metal support ring 360 which may be conveniently located onto ledge 374 of body 370. Assembly 320 desirably includes a flexible electrically conductive metallic disk 330 which comprises a flexible, resilient member 334 extending into the hollow portion 333 of disk 330 from the peripheral edge 332 thereof. An insulating ring 335 is placed between peripheral edge 332 of disk 330 and edge 362 of metal support ring 360. Flexible conductive disk 330 is sandwiched between peripheral edge 327 of end cap 325 and insulating ring 335. An insulating grommet 375 surrounds peripheral edge 327 of end cap 325 and the peripheral edge 377 of cup shaped lower body 370, and grommet 375 also surrounds disk 330 and insulating ring 335. A casing 380 in turn surrounds insulating grommet 375.

With reference to FIG. 7 current interrupt assembly 320 may be constructed by first inserting insulating grommet 375 into casing 380 so that the outer surface of the grommet contacts the inside wall of casing 380. Then a subassembly is constructed by inserting thermally responsive member 350 or 352 into cup shaped body 370, then inserting metal support ring 360 onto ledge 374 of cup shaped body 370. The plastic movable rod 340 is inserted through central aperture 363 of support ring 360 so that it comes to rest on member 350. Insulating ring 335 is placed over support ring 360 in contact with its peripheral edge 362. Disk 330 is then placed over insulating ring 335 so that the peripheral edge 332 of disk 330 rests on insulating ring 335. End cap 325 is then placed over disk 330 so that the peripheral edge 327 of end cap 325 rests on the peripheral edge 332 of disk 330. The subassembly is then inserted into the casing 380 with insulating grommet 375 contained therein. The end 380(a) of casing 380 and end 375(a) of grommet 375 is then crimped over peripheral edge 327 of end cap 325 so that the subassembly and its components is held tightly and permanently in place and sealed by grommet 375 and surrounding casing 380.

Figure 8:
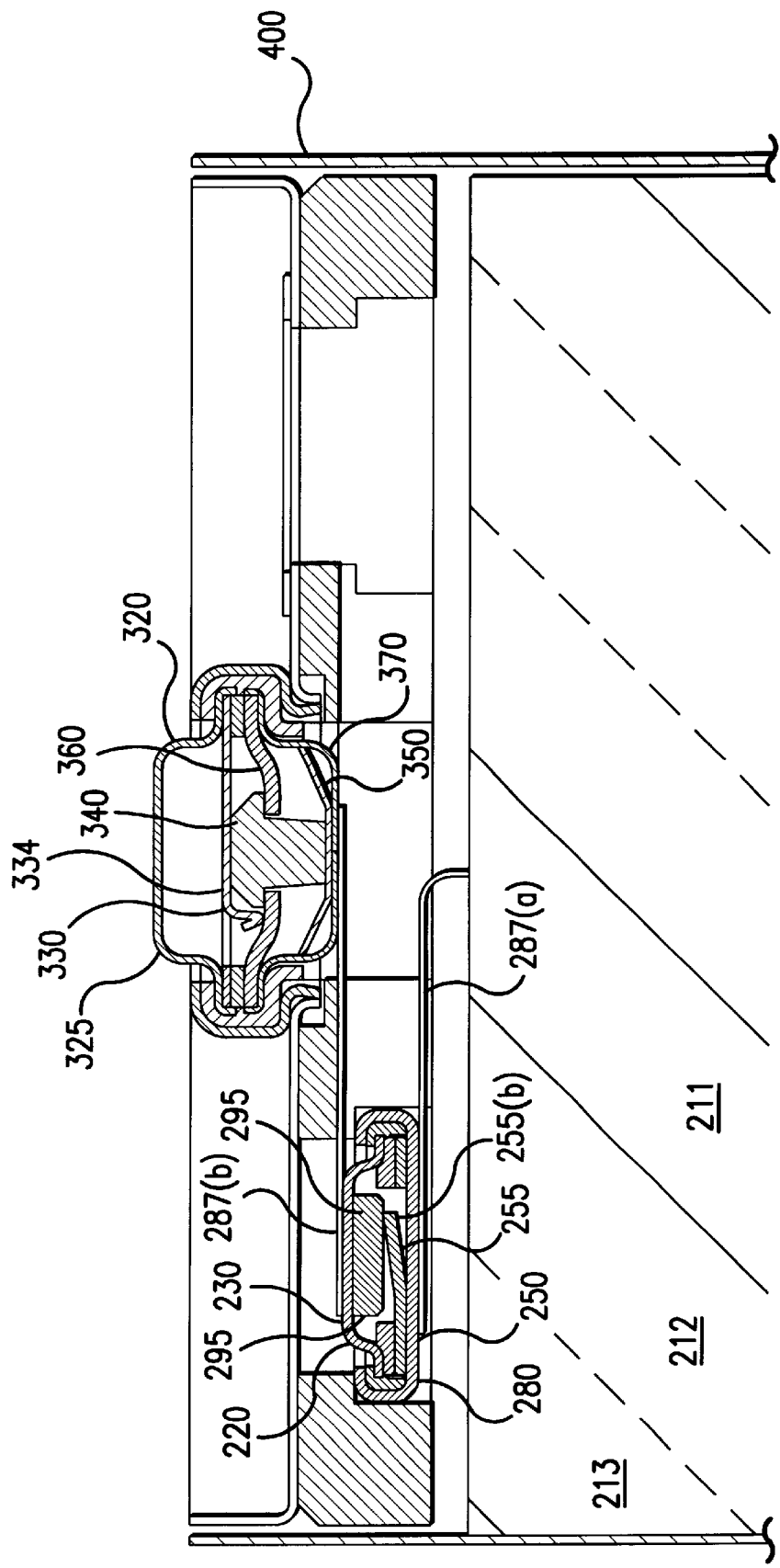
FIG. 8 is a vertical cross-sectional view of a cylindrical cell containing the current interrupter assembly embodiments shown in FIGS. 2 and 6.

Assembly 320 may be inserted into a rechargeable cylindrical cell 400, for example a lithium ion cylindrical cell, as shown in FIG. 8. End cap 325 of assembly 320 protrudes from an end of the cell and forms one of the cell terminals, typically the positive terminal. Similarly, assembly 320 may be inserted into a rechargeable prismatic cell, for example a lithium ion prismatic cell 400 shown in FIG. 4. Prismatic cell 400 as shown in FIG. 4 has a pair of opposing flat front and rear body faces 405(a) and 405(b), a pair of opposing flat side faces 408(a) and 408(b) and a pair of opposing flat end faces 409(a) and 409(b). In such application end cap 325 protrudes form an end of the cell and forms one of the cell terminals, typically the positive terminal. In either case whether a cylindrical or prismatic cell is employed, the cell may optionally also include an additional current interrupter assembly, namely, the current interrupter assembly 220 above described. Having two separately housed, self contained current interrupter assemblies provides the cell with two thermally responsive current interrupt systems which self activate independently of one another. FIG. 5 shows assembly 320 inserted into a cylindrical cell 500 having top end 509(a) and opposing bottom end 509(b).

A cell 400 with both current interrupt assemblies 220 and 320 included therein is shown in FIG. 8. Both current interrupt assemblies 220 and 320 shown in FIG. 8 are in the "on" position that is, in the position allowing current to flow normally from electrode 211 to terminal end cap 325. When the cell 400 is in such operation mode there is an electrical pathway between one of the cell electrodes, e.g., electrode 211 and cell terminal 325. In normal operation current flows from electrode 211 to connecting tab 287(*a*), to casing 280 of assembly 220, to contact plug 295, to end cap 230, and then to connector tab 287(*b*). Current flows from connector tab 287(b) to the lower body 370 of assembly 320. Current then flows from body 370 to support ring 360, to resilient arm 334 of disk 330, and then from disk 330 to terminal end cap 325. If the cell's internal temperature should reach a predetermined value, thermally responsive resilient member 255 flexes downwardly thereby breaking electrical connection between member 255 and contact plug 295. This has the effect of severing the electrical pathway between electrode 211 and terminal end cap 325 to shut down the cell. Also, if the cell's internal temperature reaches another predetermined value thermally responsive member 350 (or 352) of assembly 320 flexes upwardly to the position shown in FIG. 6. This upward movement of member 350 causes plastic rod 340 to move upwardly against flexible resilient arm 334 of disk 330. This causes resilient arm 334 to break contact with support ring 360 thereby severing the electrical pathway between electrode 211 and terminal end cap 325. If the cell's internal temperature rises very quickly, both heat responsive member 255 of assembly 220 and heat responsive member 350 (or 352) of assembly 320 will activate simultaneously causing the electrical pathway between electrode 211 and terminal end cap 325 to spontaneously break in two places. This assures an immediate shutdown of the cell and provides added safety that the cell will shut down in the event that one of the two heat responsive members malfunctions.

Alternatively, if gas pressure within the cell builds up to exceed a predetermined value, diaphragm 372 of assembly 320 will flex upwardly causing plastic rod 340 to move upwardly against resilient arm 334 causing resilient arm 334 to break contact with support ring 360. This in turn has the effect of breaking the electrical pathway between electrode 211 and terminal end cap 325 thereby shutting down the cell. Diaphragm 372 is solely responsive to the cell's internal pressure and, as such, actuates independently of the cell's internal temperature. Thus, pressure actuated diaphragm 372 assures that the cell will shut down if the gas pressure within the cell reaches a predetermined value irrespective of the cell's temperature.

In the current interrupt assembly embodiment shown in FIGS. 2 and 3 the thermally responsive disk 250 with inwardly extending resilient member 255 or disk 350 or disk 352 shown in FIGS. 6 and 7 are desirably composed of a shape memory alloy. The shape memory alloy may be selected from known memory alloy groups, for example, nickel-titanium (Ni-Ti), copper-zinc-aluminum (Cu-Zn-Al), and copper-aluminum-nickel (Cu-Al-Ni). However, it has been determined that the most desirable alloy for shape memory alloy disk 250 or disks 350 or 352 is a nickel-titanium alloy. A preferred nickel titanium memory alloy is available under the trade designation NITINOL alloy from Special Metals Corporation. Resilient member 255 of disk 250 or disks 350 or 352 may be of resettable memory alloy, that is, one that deforms when heated but returns to its original shape upon cooling to ambient temperature without application of external force. However, it is desirable that the shape memory alloy member not be resettable at ambient temperature, that is, it irreversibly deforms when heated to its activation temperature. This assures that the cell will not again become operational once conditions within the cell have caused excessive internal heating. Thus, disks 250, 350 or 352 are preferably fabricated using NITINOL alloy such that it is not resettable once it is activated. The preferred memory disk 250 may conveniently be fabricated as a single piece of NITINOL alloy having a circular peripheral edge 258 from which protrudes inwardly a flexible member 255. The flexible member 255 may conveniently be of rectangular shape fabricated with an upwardly bent outer leg 255(*d*) separated from inner leg 255(*c*) by bend line 255(*a*) (FIGS. 2 and 3). Resilient member 255 may desirably be between about 2 and 5 mm wide and between 3 and 8 mm long and of thickness between about 0.05 and 0.5 mm. Leg 255(*d*) flexes downwardly along bend line 255(*a*) with temperature between about 60° C. and 120° C. causing a break in contact between member 255 and contact plug 295. Disk 250 may desirably have a diameter between about 5 and 15 mm.

In order to achieve such activation effect it has been determined that the thickness of the memory disk 250 and resilient member 255 may advantageously be in a range between about 0.05 and 0.5 mm with a surface area such that the resistance of said member is less than about 5 milli-ohm. The above described shape for disk 250, namely a hollow disk having a circular peripheral edge from which protrudes inwardly a flexible portion 255 is desirable, since it allows for reduced thickness and good contact area to reduce the overall resistance of disk 250 as current passes through its thickness during normal cell operation. The shape memory member 255 desirably does not have a deformation strain of more than about 8 percent. The bend angle is desirably between about 10 and 30 degrees, that is, end 255(*b*) is bent upwardly at an angle of between about 10 and 30 degrees from the plane of disk 250. This allows memory member 255 to deflect away from contact plug 295 and flatten when the activation temperature is reached. In application to lithium ion cells the above described preferred design for the memory disk may result in its overall resistance being less than 5-milliohm which in turn allows a current drain of up to 5 amps under continuous cell operation.

In the current assembly embodiment shown in FIGS. 6 and 7 the thermally responsive member in the form of curved, circular disk 350 or disk in the form of a thin curved elongated slab or parallelepiped 352 may advantageously be composed of a shape memory alloy as above described (thickness between about 0.05 and 0.5 mm), preferably of NITINOL alloy. (If disk 352 is in the form of a thin elongated slab, it may be oval or have one or more pairs of opposing edges which are not parallel.) Disk 350 or 352 is preferably fabricated to irreversibly deform when exposed to a predetermined temperature desirably between about 60° C. and 120° C. If the cell internal temperature exceeds a predetermined value the disk or slab curvature reverses or flattens causing plastic rod 340 to push against resilient arm 334 of disk 330. This in turn causes a break in electrical contact between disk 330 and metal support ring 360 as above described to interrupt current flow. Thermally responsive disk 350 or 352 may alternatively be of a bimetallic construction, that is, comprising two layers of dissimilar metals having different coefficient of thermal expansion. If bimetallic construction is employed, the top layer of bimetallic disk 350 or slab 352 (the layer closest to end cap 325) may be composed of a high thermal expansion metal, preferably nickel-chromium alloy, and the underlying or bottom layer may be composed of a low thermal expansion metal, preferably nickel-iron alloy. Another suitable bimetallic composition is nickel and titanium. In such embodiment disk 350 (or disk 352) will activate when the cell temperature rises to at least 60° C. and typically can activate at a cell temperature between about 60° C. and 120° C. It is also possible to choose the high and low thermal expansion metal layers such that the disk 350 or 352 will not reset except at a temperature below −20° C. which in most applications makes the device a single action thermostatic device.

With reference to current interrupter assembly 220 (FIGS. 2 and 3) casing 280 may be formed of aluminum, stainless steel or titanium for added strength and corrosion resistance. Casing 280 desirably has a wall thickness of between about 0.1 mm and 0.5 mm. Casing 280 and therefore assembly 220 is preferably between about 3 and 15 mm in diameter, typically between about 3 and 8 mm in diameter, and has a depth of between about 1 and 10 mm, typically between about 1 and 3 mm. An assembly 220 with such overall dimensions can be inserted into very thin prismatic cells having overall thickness between about 3 and 6 mm without notably reducing cell capacity or impairing the current interrupter functionality.

Internal insulating ring 290 is desirably composed of a corrosion resistant thermoplastic material having relatively high compressive strength and temperature stability. A preferred material for insulating ring 290 is a liquid crystal polymer available under the tradename VECTRA polymer from the Celanese Co. or a polyester available under the tradename VALOX polymer from General Electric Plastics Company. Contact plug 295 is desirably formed from cold-rolled steel or stainless steel so that it may be readily welded to the undersurface of endcap 230. Contact plug 295 may be plated with a precious metal such as silver to lower its contact resistance. End cap 230 is desirably formed of stainless steel, aluminum or titanium to provide required combination of strength and corrosion resistance and has an overall diameter of between about 3 and 15 mm, preferably between about 4 and 8 mm, and an overall depth of under about 1 mm, typically between about 0.1 and 1 mm. Insulating grommet 275 may desirably have a thickness of between about 0.1 and 0.5 mm and an overall diameter of between about 3 and 15 mm, preferably between about 4 and 8 mm. Grommet 275 may be formed of a durable yet resilient, corrosion resistant thermoplastic material, for example, a high density polypropylene, which is inert to electrolyte and has sufficient resiliency to provide a good seal between casing 280 and the assembly 220 internal components.

With reference to the current interrupter assembly 320 (FIGS. 6 and 7) casing 380 may be formed of, stainless steel or nickel plated cold rolled steel for strength and corrosion resistance. Casing 380 desirably has a wall thickness of between about 0.1 mm and 0.5 mm. Casing 380 and therefore assembly 320 is preferably between about 4 and 15 mm in diameter or overall width, preferably between about 4 and 8 mm, and has a depth of between about 1 and 10 mm, typically between about 3 and 6 mm. An assembly 320 with such overall dimensions can be inserted into prismatic cells having overall thickness between about 6 and 20 mm or cylindrical cells having a diameter between about 5 and 20 mm without notably reducing cell capacity or impairing the current interrupter functionality. End cap 325 typically has an overall diameter between about 4 and 15 mm and an overall depth of between about 0.1 and 1 mm. End cap 325 may be formed of stainless steel or nickel plated cold-rolled steel to provide adequate strength and corrosion resistance. Flexible conductive disk 330 desirably has a diameter between about 4 and 15 mm and a thickness of between about 0.1 and 0.5 mm. It is desirably composed of a resilient metallic material having good electrical conductivity and strength such as a beryllium-copper alloy or spring steel which may be plated with a precious metal such as gold or silver to lower its contact resistance. Resilient arm 334 of disk 330 may desirably be of a rectangular shape having a width of between about 2 and 5 mm, a length of between about 3 and 8 mm, and thickness of between about 0.1 and 0.5 mm.

Insulating ring 335 desirably composed of a corrosion resistant thermoplastic material having relatively high compressive strength and temperature stability. A preferred material for insulating ring 335 is a liquid crystal polymer available under the trade designation VECTRA polymer from the Celanese Co. or a polyester available under the designation VALOX polymer from General Electric Plastics Company. Moveable rod 340 may have a diameter or width between about 1 and 3 mm and a length between about 1 and 5 mm. Rod 340 is essentially electrically nonconductive (formed of material which has high resistivity) and should be thermally stable even when exposed to high temperatures, for example, 120° C. and higher. A preferred material for rod 340 is liquid crystal polymer available under the trade designation VECTRA polymer from the Celanese Co. Metal support ring 360 desirably has a diameter between about 4 and 15 mm, preferably between about 4 and 8 mm, and a thickness between about 0.1 and 1 mm. Support ring 360 may be readily formed of stainless steel or cold rolled steel to provide adequate strength. Such material may be plated with a precious metal such as gold or silver to lower the contact resistance. The depth of cup shaped body 370 may desirably between about 1 and 3 mm. Pressure actuated diaphragm 372 which desirably forms the base of cup shaped body 370 may have a diameter between about 4 and 15 mm and wall thickness of between about 0.1 and 0.5 mm. Cup shaped body 370 and diaphragm 372 may be readily formed of aluminum which is readily and permanently deformed when exposed to an elevated pressure differential. Insulating grommet 375 may desirably have a thickness of between about 0.1 and 0.5 mm and an overall diameter of between about 4 and 15 mm. Grommet 375 may be formed of a durable yet resilient, corrosion resistant thermoplastic material, for example, a high density polypropylene, which is inert to electrolyte and has sufficient resiliency to provide a good seal between casing 380 and the assembly 320 internal components.

Although the invention has been described with reference to preferred embodiments, it should be understood that modifications of the described embodiments are possible without departing from the concept of the invention. Therefore, the invention is not intended to he limited to the specific embodiments but rather is defined by the claims and equivalents thereof.

What is claimed is:

1. In an electrochemical cell formed by a current interrupter assembly inserted into an open ended case for the cell, said cell further having a positive and a negative terminal and a pair of internal positive and negative electrodes, wherein said assembly has a housing, a chamber within said housing and an exposed end cap plate, said end cap plate functional as a cell terminal, the improvement comprising said end cap plate being electrically connected to one of said electrodes through an electrically conductive pathway within said assembly, wherein said assembly comprises therein a flexible electrically conductive member forming a portion of said electrical pathway within said assembly, said assembly further comprising a thermally responsive means for causing current to cease flowing through the cell when a predetermined temperature level is reached, wherein said thermally responsive means comprises a member of shape memory alloy having a curved surface, wherein said assembly further comprises physical means for causing movement of said flexible conductive member responsive to change in surface curvature of said shape memory member, wherein when the cell temperature reaches a predetermined temperature said shape memory member deflects altering the curvature on at least a portion of its surface causing movement of said flexible conductive member to break said electrical pathway between said end cap plate and said electrode thereby preventing current from flowing through the cell, wherein said cell further comprises a second current interrupter assembly, said second assembly comprising a housing, a chamber within the housing, and an end cap sealed from said housing, said second assembly having an electrically conductive pathway therethrough between said housing and said second assembly end cap, wherein said second assembly comprises a thermally responsive means within said chamber for preventing current from flowing through said electrical pathway within said assembly, said thermally responsive means comprising a shape memory alloy member activatable when the temperature within said assembly reaches a predetermined level causing a break in said electrically conductive pathway through said second assembly thereby causing the cell to cease operating.

2. The electrochemical cell of claim 1 wherein said shape memory metal member in said current interrupter assemblies comprises a disk of shape memory alloy, wherein said disk has a curved surface which flexes in the direction of its thickness when a predetermined temperature is reached.

3. The electrochemical cell of claim 2 wherein said disk has thickness of between about 0.05 and 0.5 mm.

4. The electrochemical cell of claim 1 wherein said means for causing movement in the flexible conductive member responsive to change in surface curvature of said memory metal member is an electrically nonconductive member located within said chamber and in physical communication with said shape memory member so that when said memory member deflects, said nonconductive member moves against said flexible conductive member to break the electrical pathway between said end cap plate and said electrode.

5. The electrochemical cell of claim 4 wherein said electrically nonconductive member is a plastic elongated member.

6. The electrochemical cell of claim 1 wherein the flexible conductive member comprises a disk having an aperture therethrough, said disk having an outer edge with a flexible portion protruding into said aperture from a portion of the outer edge, wherein the outer edge rests on a surface of an insulating member within said end cap assembly and said flexible portion is moveable responsive to deflection of said shape memory member to cause a break in said electrical pathway.

7. The electrochemical cell of claim 1 wherein said cell is a rechargeable cell.

8. A current interrupter assembly for an electrochemical cell, said assembly being a self-contained, sealed unit comprising a housing, a chamber within the housing, and an end cap sealed from said housing, said assembly having an electrically conductive pathway therethrough between said housing and said end cap, wherein said assembly is insertable in a cell to form a portion of the electrical pathway between one of the cell electrodes and a corresponding cell terminal, wherein said assembly comprises a flexible conductive member which forms a portion of said electrical pathway and a thermally responsive means for preventing current from flowing through said electrical pathway when the temperature within said assembly exceeds a predetermined level, said thermally responsive means comprising a thermally responsive disk of shape memory alloy having a curved surface, wherein said assembly further comprises physical means for causing movement of said flexible conductive member responsive to change in surface curvature of said thermally responsive disk, wherein when the cell temperature reaches a predetermined temperature said disk deflects activating said physical means thereby moving said flexible conductive member to break the electrical pathway within said assembly, wherein said physical means for causing movement in the flexible conductive member if an electrically nonconductive member located within said chamber and in physical communication with said thermally responsive disk so that when said disk deflects, the nonconductive member pushes against said flexible conductive member to break the electrical pathway within the assembly, wherein paid current interrupter assembly further comprises a pressure actuated diaphragm forming a portion of said assembly housing and having a surface exposed to the environment outside of said assembly for causing movement of said flexible conductive member responsive to deflection of said diaphragm, wherein when the gas pressure on the exposed side of said diaphragm rises, said diaphragm deflects towards the interior of said assembly causing said nonconductive member to push said flexible conductive member thereby breaking said electrical pathway within said assembly.

9. The current interrupter assembly of claim 8 wherein the thickness of said thermally responsive disk is between 0.05 and 0.5 mm.

* * * * *